(12) United States Patent
Kimura et al.

(10) Patent No.: US 11,054,246 B2
(45) Date of Patent: Jul. 6, 2021

(54) THICKNESS MEASURING APPARATUS

(71) Applicant: DISCO CORPORATION, Tokyo (JP)

(72) Inventors: Nobuyuki Kimura, Tokyo (JP); Keiji Nomaru, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 0 days.

(21) Appl. No.: 16/738,235

(22) Filed: Jan. 9, 2020

(65) Prior Publication Data

US 2020/0217641 A1 Jul. 9, 2020

(30) Foreign Application Priority Data

Jan. 9, 2019 (JP) .............................. JP2019-001584

(51) Int. Cl.
*G01B 11/06* (2006.01)
*G01B 9/02* (2006.01)
(Continued)

(52) U.S. Cl.
CPC ........ *G01B 11/0608* (2013.01); *B23K 26/032* (2013.01); *G01B 9/02015* (2013.01);
(Continued)

(58) Field of Classification Search
CPC ............ G01B 9/02015; G01B 11/0608; G01B 11/06; G02B 27/14; G02B 27/144; G02B 5/18; G02B 6/02214; G02B 13/22; B23K 26/53; B23K 26/032; B23K 2103/56; H01L 22/12
See application file for complete search history.

(56) References Cited

U.S. PATENT DOCUMENTS 6,137,575 A * 10/2000 Sugiyama .......... G01B 11/0625
356/493
6,236,459 B1 * 5/2001 Negahdaripour ...... A61B 3/101
356/496
(Continued)

FOREIGN PATENT DOCUMENTS

JP 2011122894 A 6/2011
JP 2012021916 A 2/2012

OTHER PUBLICATIONS

U.S. Appl. No. 16/717,067, filed Dec. 17, 2019.
U.S. Appl. No. 16/715,672, filed Dec. 16, 2019.

*Primary Examiner* — Michael P LaPage
(74) *Attorney, Agent, or Firm* — Greer, Burns & Crain, Ltd.

(57) ABSTRACT

A thickness measuring apparatus has a thickness measuring unit including a white light source, a diffracting mechanism that diffracts white light emitted from the white light source into diffracted light at time differences corresponding to the wavelengths of light components of the white light, a two-dimensional image sensor having a photodetection area that include a plurality of pixels for detecting return light reflected from upper and lower surfaces of a plate-shaped workpiece, a storage unit that stores, as a spectral interference waveform, intensities of the return light corresponding to the wavelengths of the light components successively received at the time differences by the pixels, and a waveform table recording therein a plurality of kinds of sample spectral interference waveforms corresponding to plate-shaped workpiece thicknesses.

16 Claims, 5 Drawing Sheets

(51) Int. Cl.
*G02B 27/14* (2006.01)
*B23K 26/03* (2006.01)
*G02B 13/22* (2006.01)

(52) U.S. Cl.
CPC .............. *G01B 11/06* (2013.01); *G02B 27/14* (2013.01); *G02B 13/22* (2013.01)

(56) References Cited

U.S. PATENT DOCUMENTS

| | | | | |
|---|---|---|---|---|
| 6,824,813 | B1* | 11/2004 | Lill | C23C 16/401 |
| | | | | 118/665 |
| 10,955,233 | B2 | 3/2021 | Kimura et al. | |
| 2004/0246493 | A1* | 12/2004 | Kim | G01B 11/0625 |
| | | | | 356/504 |
| 2007/0046953 | A1* | 3/2007 | De Groot | G03F 7/70625 |
| | | | | 356/512 |
| 2011/0279822 | A1* | 11/2011 | Kannaka | G01B 11/2441 |
| | | | | 356/503 |
| 2018/0045506 | A1* | 2/2018 | Kitagawa | G01B 11/0625 |
| 2018/0252518 | A1* | 9/2018 | Chalmers | G01B 11/0675 |

\* cited by examiner

WAVEFORM TABLE 140

| THICKNESS (μm) | SAMLE SPECTRAL INTERFERENCE WAVEFORM |
|---|---|
| 5 | |
| 10 | |
| 15 | |
| ⋮ | ⋮ |
| 100 | |
| ⋮ | ⋮ |
| 355 | S |
| ⋮ | ⋮ |
| 495 | |
| 500 | |

THICKNESS MEASURING APPARATUS

BACKGROUND OF THE INVENTION

Field of the Invention

The present invention relates to a thickness measuring apparatus for measuring thicknesses of a plate-shaped workpiece.

Description of the Related Art

Wafers with a plurality of devices such as integrated circuits (ICs), large scale integration (LSI), etc. formed in areas demarcated by a plurality of projected dicing lines are thinned by having their reverse side ground by a grinding apparatus, and then divided by a dicing apparatus or a laser processing apparatus into individual device chips, which will be used in electric appliances such as mobile phones, personal computers, and so on.

A grinding apparatus for grinding the reverse side of a wafer generally includes a chuck table for holding the wafer thereon, a grinding unit having a rotatable grinding wheel for grinding the wafer held on the chuck table, and a measuring unit measuring the thickness of the wafer held on the chuck table. The grinding apparatus is able to process, i.e., grind, the wafer to a desired thickness.

One known measuring unit measuring of the thickness of a wafer, for use in the grinding apparatus, is of the contact type which has a prober, i.e., sensor terminal, brought into contact with the ground surface of the wafer for measuring the thickness of the wafer. However, the thickness measuring unit of the contact type is liable to damage the ground surface of the wafer because it is contacted by the prober. Another measuring unit, which has been used to avoid the drawback of the contact-type measuring unit, is of the non-contact type that measures the thickness of a wafer using a refractive interference waveform produced due to the difference between optical path lengths for light reflected from the ground surface of the wafer and light passing through the wafer and reflected from a lower surface of the wafer (see, for example, Japanese Patent Laid-Open No. 2012-021916).

The measuring unit measuring the thickness of a wafer is also used in a processing apparatus that applies a laser beam having a waveform transmittable through the wafer to the wafer while positioning a focused spot of the laser beam within the wafer thereby to form modified layers in the wafer. The measuring unit incorporated in the processing apparatus accurately measures the thickness of the wafer to make it possible to position the focused spot of the laser beam exactly at a desired position spaced from an upper surface of the wafer (see, for example, Japanese Patent Laid-Open No. 2011-122894).

SUMMARY OF THE INVENTION

According to the technologies disclosed in Japanese Patent Laid-Open No. 2012-021916 and Japanese Patent Laid-Open No. 2011-122894, light is applied to a point on a wafer whose thickness is to be measured, and reflected light rays from upper and lower surfaces of the wafer are diffracted by a diffraction grating. A spectral interference waveform based on the intensities of the light rays diffracted into respective wavelengths is processed by a waveform analyzing process based on the Fourier transform theory or the like, thereby detecting a local thickness of the wafer. In case the wafer is to be measured for thicknesses over its entire surface, the entire surface of the wafer needs to be scanned to detect the thickness of the wafer at each of points on the wafer to which the light is applied. Therefore, the process for measuring the thicknesses of the wafer over its entire surface is poor in efficiency.

It is therefore an object of the present invention to provide a thickness measuring apparatus that is capable of efficiently measuring thicknesses of a plate-shaped workpiece over a wide range thereon.

In accordance with an aspect of the present invention, there is provided a thickness measuring apparatus for measuring thicknesses of a plate-shaped workpiece, including a chuck table that holds the plate-shaped workpiece thereon and a thickness measuring unit that measures thicknesses of the plate-shaped workpiece held on the chuck table in a non-contact manner, in which the thickness measuring unit includes a white light source, a diffracting means that diffracts white light emitted from the white like source into diffracted light at time differences corresponding to the wavelengths of light components of the white light, a beam splitter that applies the diffracted light from the diffracting means to a two-dimensional area defined along X-axis directions and Y-axis directions over the plate-shaped workpiece held on the chuck table, a two-dimensional image sensor for detecting return light reflected from upper and lower surfaces of the plate-shaped workpiece in the two-dimensional area, through the beam splitter, a storage unit that stores, as a spectral interference waveform, intensities of the return light corresponding to the wavelengths of the light components successively received at the time differences by a plurality of pixels of the two-dimensional image sensor that are arrayed in the X-axis directions and the Y-axis directions in association with the two-dimensional area over the plate-shaped workpiece, a waveform table recording therein a plurality of kinds of sample spectral interference waveforms corresponding to plate-shaped workpiece thicknesses, and a thickness deciding section that decides thicknesses of the plate-shaped workpiece at coordinate positions defining the two-dimensional area over the plate-shaped workpiece, in which the thickness deciding section compares the spectral interference waveform stored in the storage unit with the sample spectral interference waveforms recorded in the waveform table and decides a plate-shaped workpiece thickness corresponding to one of the sample spectral interference waveform that has agreed with the spectral interference waveform as a thickness of the plate-shaped workpiece.

Preferably, the thickness measuring unit further includes a condenser lens disposed between the diffracting means and the beam splitter, a telecentric lens for converting the diffracted light dispersed from the beam splitter into parallel light and applying the parallel light to the two-dimensional area defined along X-axis directions and Y-axis directions over the plate-shaped workpiece held on the chuck table, and a collimation lens disposed between the beam splitter and the two-dimensional image sensor, for converting the return light reflected from the upper and lower surfaces of the plate-shaped workpiece into parallel light. Preferably, the white light source is selected from a group consisting of a superluminescent diode (SLD) light source, an amplified spontaneous emission (ASE) light source, a supercontinuum light source, a light-emitting diode (LED) light source, a halogen light source, a xenon light source, a mercury light source, and a metal halide light source.

In accordance with another aspect of the present invention, there is also provided a processing apparatus incorporating the above thickness measuring apparatus.

The thickness measuring apparatus according to the present invention is able to simultaneously measure thicknesses of a plate-shaped workpiece over a wide area. As the thickness measuring apparatus is able to simultaneously measure thicknesses of a plate-shaped workpiece over a wide area, the processing apparatus that incorporates the thickness measuring apparatus can efficiently process the plate-shaped workpiece as a workpiece using information about the thicknesses of the plate-shaped workpiece.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

Figure 1:
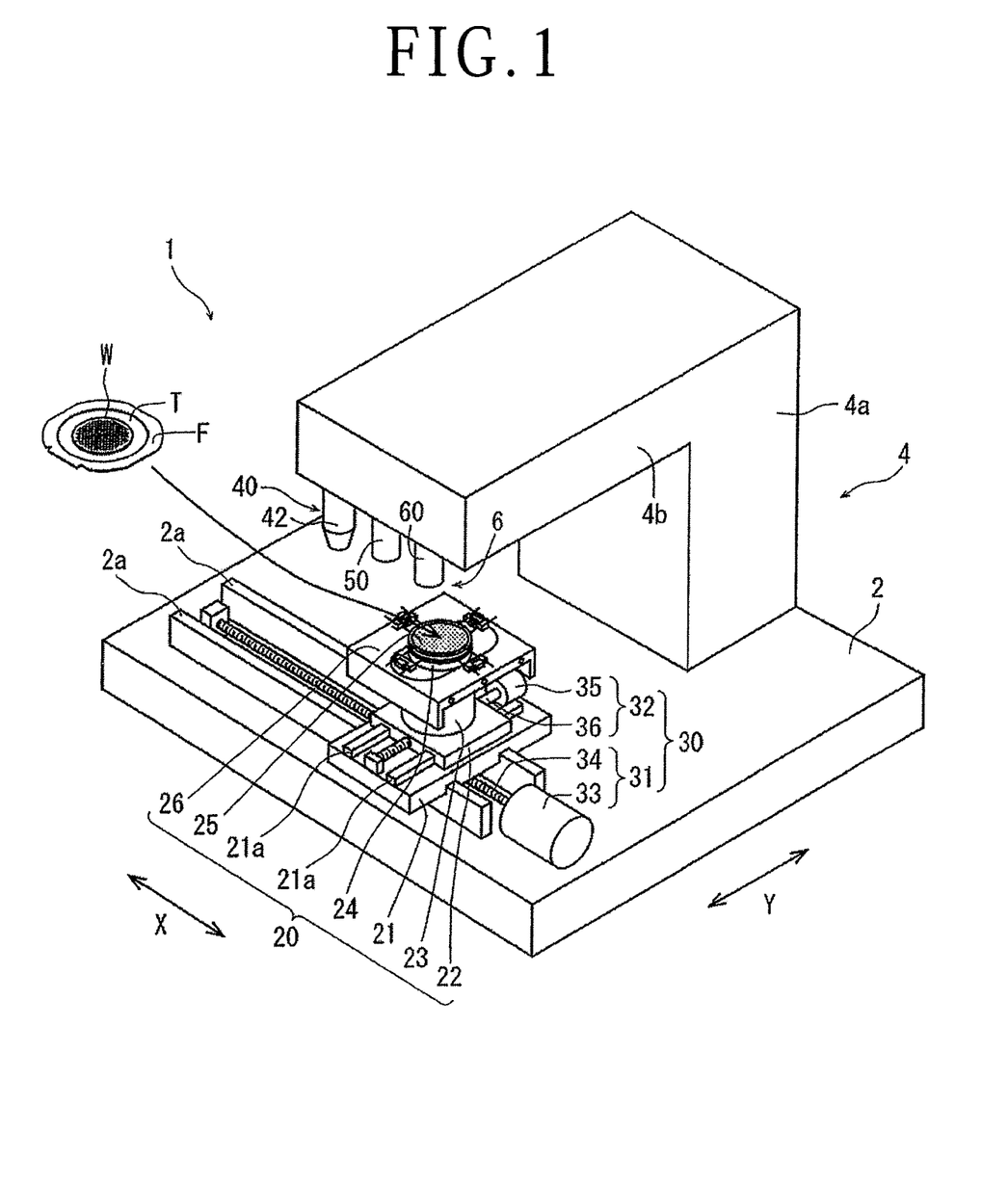
FIG. 1 is a perspective view of a laser processing apparatus incorporating therein a thickness measuring apparatus according to an embodiment of the present invention.

A thickness measuring apparatus according to an embodiment of the present invention and a processing apparatus incorporating the thickness measuring apparatus therein will be described in detail below with reference to the accompanying drawings. FIG. 1 depicts in perspective a laser processing apparatus 1 according to the present embodiment that applies a laser beam having a waveform transmittable through a plate-shaped workpiece, e.g., a wafer W of silicon, to the wafer W while positioning a focused spot of the laser beam within the wafer W thereby to form modified layers in the wafer W.

As illustrated in FIG. 1, the laser processing apparatus 1 includes a holding unit 20 holding a wafer W supported on an annular frame F by a protective tape T, a moving mechanism 30 for moving the holding unit 20, a laser beam applying unit 40 applying a laser beam to the wafer W held on the holding unit 20, an alignment unit 50, and a thickness measuring apparatus 6 including a thickness measuring unit 60.

The holding unit 20 includes a rectangular X-axis movable plate 21 mounted on a stationary base 2 for movement in X-axis directions indicated by the arrow X, a rectangular Y-axis movable plate 22 mounted on the X-axis movable plate 21 for movement in Y-axis directions indicated by the arrow Y, a hollow cylindrical support post 23 fixed to an upper surface of the Y-axis movable plate 22, and a rectangular cover plate 26 fixed to an upper end of the support post 23. The cover plate 26 is disposed around a circular chuck table 24 that extends upwardly through an oblong hole defined in the cover plate 26. The chuck table 24 holds the wafer W thereon and is rotatable about its own axis by a rotary drive means, not depicted. The chuck table 24 supports on its upper surface a circular suction chuck 25 that is made of a porous material and extends substantially horizontally. The suction chuck 25 is connected to a suction means, not depicted, through a channel extending through the support post 23. The chuck table 24 supports thereon a plurality of clamps for fixing in position the annular frame F that supports the wafer W through the protective tape T. The X-axis directions and the Y-axis directions jointly define a substantially horizontal plane.

The moving mechanism 30 is disposed on the base 2 and includes an X-axis feeding mechanism 31 for process-feeding the holding unit 20 in the X-axis directions and a Y-axis feeding mechanism 32 for index-feeding the holding unit 20 in the Y-axis directions. The X-axis feeding mechanism 31 converts rotary motion of a stepping motor 33 into linear motion through a ball screw 34 and transmitting the linear motion to the X-axis movable plate 21, thereby moving the X-axis movable plate 21 in one or the other of the X-axis directions along a pair of guide rails 2a on the base 2. The Y-axis feeding mechanism 32 converts rotary motion of a stepping motor 35 into linear motion through a ball screw 36 and transmitting the linear motion to the Y-axis movable plate 22, thereby moving the Y-axis movable plate 22 in one or the other of the Y-axis directions along a pair of guide rails 21a on the X-axis movable plate 21. Although not depicted, position detecting means are disposed respectively on the X-axis feeding mechanism 31, the Y-axis feeding mechanism 32, and the chuck table 24. The position detecting means accurate detect the positions of the chuck table 24 in the X-axis directions and the Y-axis directions, and the angular position of the chuck table 24 about its own axis, and transmit information about the detected positions to a control unit 10 (see FIG. 2) to be described later. In response to the supplied information, the control unit 10 generates control signals for actuating the X-axis feeding mechanism 31, the Y-axis feeding mechanism 32 and energizing the rotary drive means, not depicted, of the chuck table 24 to position the chuck table 24 at desired coordinate positions and angular position.

Figure 2:
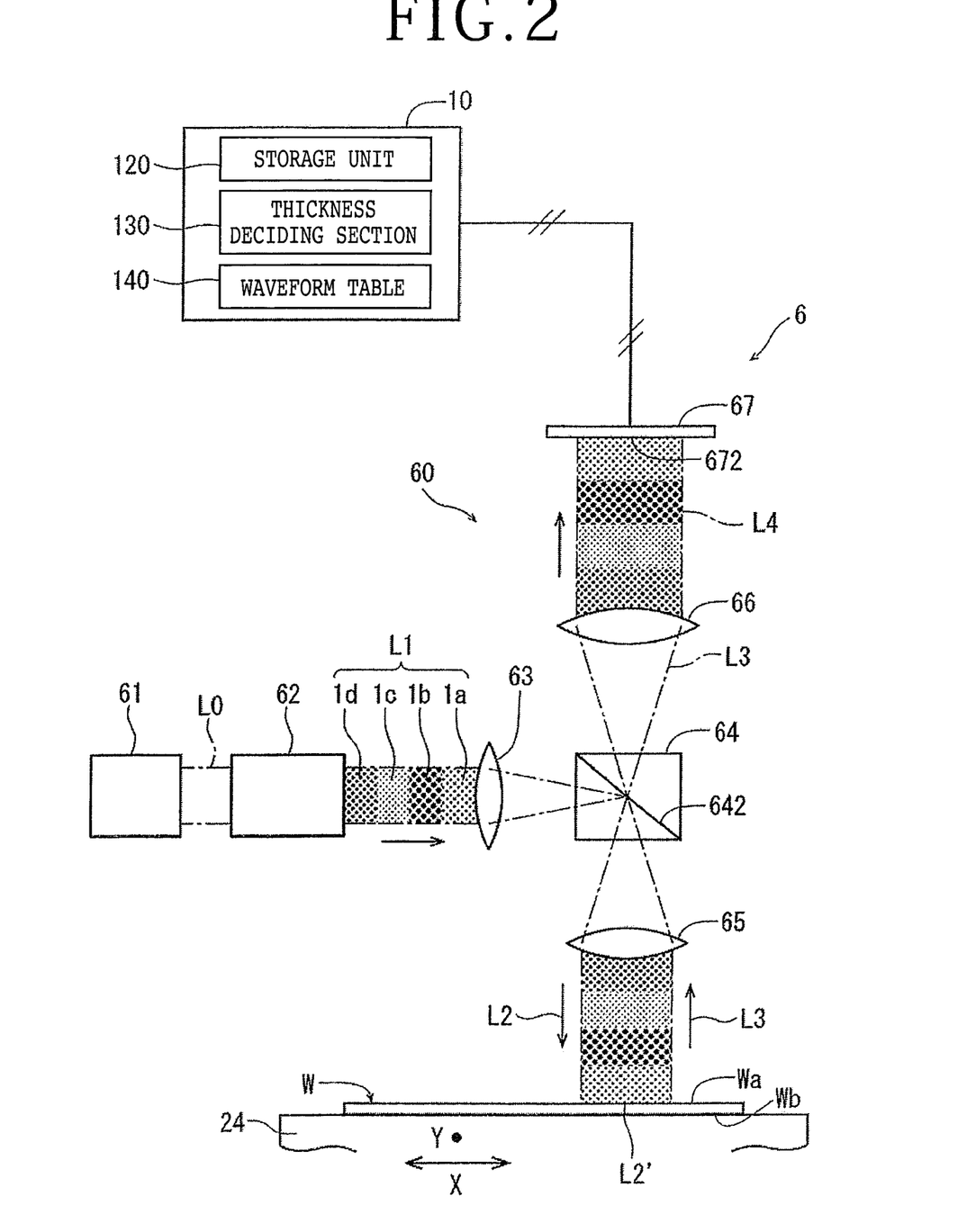
FIG. 2 is a block diagram illustrating a general layout of the thickness measuring apparatus illustrated in FIG. 1.

The control unit 10 is in the form of a computer and includes a central processing unit (CPU) for performing arithmetic processing operations according to control programs, a read only memory (ROM) for storing the control programs, etc., a read/write random access memory (RAM) for temporarily storing results of arithmetic processing operations, etc., an input interface, and an output interface, the details of which are omitted from illustration. The control unit 10 functions as a control unit controlling the above components of the laser processing apparatus 1. In addition, as illustrated in FIG. 2, the control unit 10 includes a storage unit 120, a thickness deciding section 130, and a waveform table 140 of the thickness measuring apparatus 6 as described later.

As illustrated in FIG. 1, the laser processing apparatus 1 includes a frame 4 disposed laterally of the moving mechanism 30. The frame 4 includes a vertical wall 4a disposed on the base 2 and a horizontal wall 4b extending horizontally from an upper end portion of the vertical wall 4a. The horizontal wall 4b houses therein an optical system, not depicted, of the laser beam applying unit 40. A beam condenser 42, which is a part of the laser beam applying unit 40, is disposed on a lower surface of a distal end portion of the horizontal wall 4b. The beam condenser 42 houses a condensing lens, etc. therein. The laser beam applying unit 40 also includes a laser oscillator, not depicted. A laser beam emitted from the laser oscillator is converged by the condensing lens in the beam condenser 42 and applied to a predetermined position on the wafer W held by the holding unit 20. The laser beam from the laser oscillator is a pulsed laser beam.

The alignment unit 50 is disposed on the lower surface of the distal end portion of the horizontal wall 4b at a position adjacent to the beam condenser 42 in one of the X-axis directions. The alignment unit 50 includes an ordinary image capturing element, i.e., a charge-coupled device (CCD), for capturing an image with a visible light beam, an infrared radiation applying means applying an infrared radiation to a workpiece, an optical system for catching the infrared radiation applied by the infrared radiation applying means, and an image capturing element, i.e., an infrared radiation CCD, for outputting an electric signal representing the infrared radiation caught by the optical system, all not depicted.

The thickness measuring apparatus 6 will be described below with reference to FIGS. 1 and 2. The thickness measuring apparatus 6 includes the holding unit 20 holding the wafer W and the thickness measuring unit 60. The thickness measuring unit 60 is disposed on the lower surface of the distal end portion of the horizontal wall 4b at a position adjacent to the alignment unit 50 in one of the X-axis directions. The thickness measuring unit 60 includes a white light source 61, a diffracting means 62, a condenser lens 63, a beam splitter 64, a telecentric lens 65, a collimation lens 66, a two-dimensional image sensor 67, and the storage unit 120, the thickness deciding section 130, and the waveform table 140 of the control unit 10. The two-dimensional image sensor 67 is connected to the control unit 10.

Figure 3:
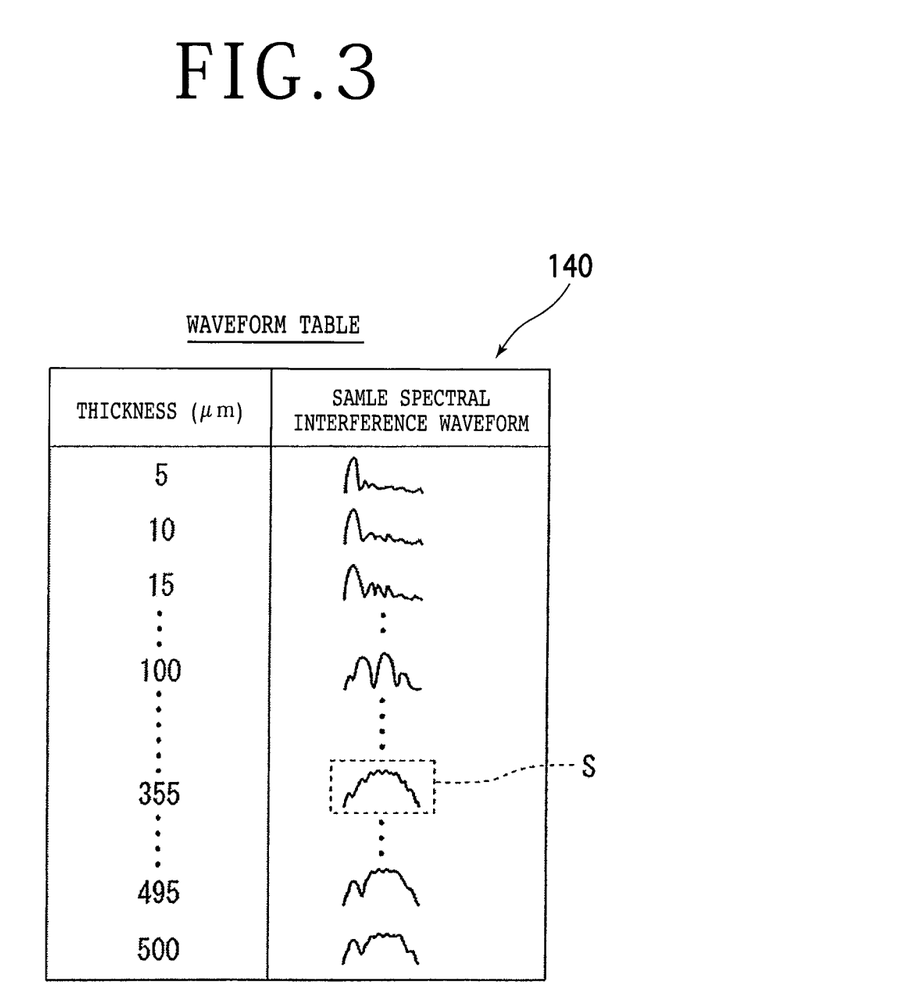
FIG. 3 is a diagram illustrating a waveform table included in a thickness measuring unit of the thickness measuring apparatus illustrated in FIG. 2.

The storage unit 120 is constructed as the RAM, not depicted, of the control unit 10, or an external storage device, not depicted, or a combination of the RAM and an external storage device, and can store information detected by the two-dimensional image sensor 67. As illustrated in FIG. 3, the waveform table 140 is a record of a plurality of kinds of sample spectral interference waveforms in relation to respective plate-shaped workpiece thicknesses. The thickness deciding section 130 determines the thickness of the wafer W on the basis of the information, i.e. a spectral interference waveform, detected by the two-dimensional image sensor 67 and the sample spectral interference waveforms recorded in the waveform table 140. The thickness deciding section 130 may be implemented by a processing program stored in the ROM, not depicted, of the control unit 10. The waveform table 140 is generated by experiments, simulations, or the like conducted in advance, and stored in the ROM, not depicted, of the control unit 10 or an external storage device. The storage unit 120, the thickness deciding section 130, and the waveform table 140 may not necessarily be included in the control unit 10, but may be constructed as devices independent of the control unit 10.

The white light source 61 is a light source for emitting white light L0 containing well-balanced proportions of visible light in a wavelength range from 400 to 900 nm. The white light source 61 may be selected from a light source group including the SLD light source, the ASE light source, a supercontinuum (SC) light source, an LED light source, a halogen light source, a xenon light source, a mercury light source, a metal halide light source, etc.

The white light L0 emitted from the white light source 61 is guided to the diffracting means 62. The diffracting means 62 is a so-called sweep device that generates diffracted light L1 at time differences corresponding to the wavelengths of light components of the white light L0 from the white light source 61. The diffracting means 62 may be implemented by an optical fiber capable of wavelength dispersion. More specifically, an optical fiber may include a diffraction grating formed to provide different reflecting positions for the respective wavelengths, such that a light component having a shorter wavelength is reflected over a shorter reflection distance and a light component having a longer wavelength is reflected over a longer reflection distance. For example, as illustrated in FIG. 2, the diffracted light L1 generated by the diffracting means 62 is made up of blue light 1a having a shortest wavelength that is emitted earliest, green light 1b, yellow light 1c, and red light 1d having successively longer wavelength that is subsequently emitted in succession. According to the embodiment illustrated in FIG. 2, the diffracting means 62 generates and emits the diffracted light L1 made up of light components of four wavelengths, i.e., the blue light 1a, the green light 1b, the yellow light 1c, and the red light 1d. Actually, the diffracting means 62 does not generate and emit the diffracted light L1 made up of only the light components of the four wavelengths, but generates and emits diffracted light L1 made up of the blue light 1a, the green light 1b, the yellow light 1c, the red light 1d, and other light components at time differences with their own wavelengths at their boundaries.

The condenser lens 63 and the beam splitter 64 are disposed on the optical path for the diffracted light L1 emitted from the diffracting means 62. According to the present embodiment, a half-silvered mirror is used as the beam splitter 64. The beam splitter 64 includes a reflection surface 642 that reflects and guides part of the diffracted light L1 that has travelled horizontally from the condenser lens 63, while dispersing it, along an optical path bent at a right angle vertically downwardly toward the telecentric lens 65. The diffracted light L1 guided to the telecentric lens 65 is magnified in diameter and converted thereby into parallel light, i.e., a collimated beam, which is applied as magnified diffracted light L2 to a two-dimensional area, defined in the X-axis directions and the Y-axis directions, over the wafer W held by the holding unit 20.

The magnified diffracted light L2 applied vertically downwardly to the two-dimensional area over the wafer W is reflected by an upper surface Wa and a lower surface Wb of the wafer W in the two-dimensional area, and guided as return light L3 to the telecentric lens 65. Since the magnified diffracted light L2 and the return light L3 travel along the same optical path, they are distinguished from each other by the downward allow L2 and the upward arrow L3, respectively. The return light L3 guided to the telecentric lens 65 is converged thereby and guided again to the beam splitter 64. Part of the return light L3 guided to the beam splitter 64 passes through the reflection surface 642 and is then guided to the collimation lens 66 that is disposed between the beam splitter 64 and the two-dimensional image sensor 67.

The return light L3 guided to the collimation lens 66 is converted thereby into parallel light, i.e., a collimated beam, as return light L4, which is detected by a photodetection area 672 of the two-dimensional image sensor 67. The photodetection area 672 of the two-dimensional image sensor 67 is made up of a plurality of pixels arrayed in the X-axis directions and the Y-axis directions in association with the two-dimensional area over the wafer W to which the magnified diffracted light L2 is applied. Each of the pixels generates the intensity of the return light L4 that represents the diffracted wavelengths successively received at the time differences and outputs the generated intensity as a spectral interference waveform to the control unit 10. The spectral interference waveform from each of the pixels is stored in the storage unit 120 of the control unit 10. The thickness deciding section 130 compares the spectral interference waveform stored in the storage unit 120 with the sample spectral interference waveforms from the waveform table 140, determines the thickness corresponding to the sample spectral interference waveform that has agreed with the spectral interference waveform stored in the storage unit 120, and decides the thickness as a thickness at a predetermined coordinate position on the wafer W. The thickness decided by the thickness deciding section 130 is stored in the storage unit 120 in association with the coordinate position on the wafer W.

In the illustrated embodiment, a half-silvered mirror is used as the beam splitter 64. The present invention is not limited to such a detail. A polarizing beam splitter, for example, may be used as the beam splitter 64. In case a polarizing beam splitter is used as the beam splitter 64, a quarter-wave plate is disposed between the beam splitter 64 and the telecentric lens 65. The quarter-wave plate disposed between the beam splitter 64 and the telecentric lens 65 converts the diffracted light L1, i.e., S-polarized light, reflected by the reflection surface 642 of the beam splitter 64 into circularly polarized light, and converts the return light L3, i.e., circularly polarized light, reflected by the wafer W into P-polarized light, which passes through the reflection surface 642 of the beam splitter 64 and is guided through the collimation lens 66 to the two-dimensional image sensor 67.

The thickness measuring apparatus 6 according to the present embodiment and the laser processing apparatus 1 that incorporates the thickness measuring apparatus 6 therein are constructed as described above. Operation of the thickness measuring apparatus 6 and the laser processing apparatus 1 will be described below.

As illustrated in FIG. 1, when the laser processing apparatus 1 according to the present embodiment is to perform a laser processing operation, the wafer W is prepared as a plate-shaped workpiece to be processed by the laser processing apparatus 1. For example, the wafer W that is made of silicon has a plurality of devices formed in areas demarcated by a plurality of projected dicing lines and is supported on the annular frame F by the protective tape T.

The prepared wafer W is then placed on the suction chuck 25 on the chuck table 24 of the holding unit 20, and the suction means, not depicted, is actuated to hold the wafer W under suction on the suction chuck 25 on the chuck table 24. The wafer W held under suction on the chuck table 24 is then fixed in place by the clamps that are actuated to grip the frame F.

Then, the X-axis feeding mechanism 31 and the Y-axis feeding mechanism 32 included in the holding unit 20 are actuated to move the chuck table 24 in the X-axis directions indicated by the arrow X in FIG. 2 and the Y-axis directions perpendicular to the sheet of FIG. 2 to a position directly below a region where the thickness measuring unit 60 is disposed.

After the chuck table 24 has been moved to the position directly below the thickness measuring unit 60, the thickness measuring unit 60 starts a thickness measuring process. The white light source 61 is energized to emit white light L0 containing well-balanced proportions of visible light in a wavelength range from 400 to 900 nm. The emitted white light L0 is applied to the diffracting means 62, which generates and emits diffracted light L1 at time differences corresponding to the wavelengths of light components of the white light L0. Specifically, the diffracting means 62 generates and emits blue light 1a, green light 1b, yellow light 1c, and red light 1d successively at time differences, i.e., light components of the white light L0 that have respective wavelengths of 400 nm . . . 500 nm . . . 600 nm . . . 900 nm successively at time differences.

The diffracted light L1 emitted from the diffracting means 62 is guided to the condenser lens 63, which converges and guides the diffracted light L1 to the beam splitter 64. Part of the diffracted light L1 is reflected by the reflection surface 642 of the beam splitter 64 to travel along an optical path bent at a right angle toward the wafer W on the chuck table 24 of the holding unit 20. Specifically, the diffracted light L1 reflected by the reflection surface 642 of the beam splitter 64 is dispersed and guided to the telecentric lens 65. The diffracted light L1 guided to the telecentric lens 65 is magnified in diameter and converted thereby into parallel light, which is applied as magnified diffracted light L2 to the two-dimensional area, defined in the X-axis directions and the Y-axis directions, over the wafer W held by the holding unit 20. The two-dimensional area, defined in the X-axis directions and the Y-axis directions, over the wafer W will be described below with reference to FIG. 4.

Figure 4:
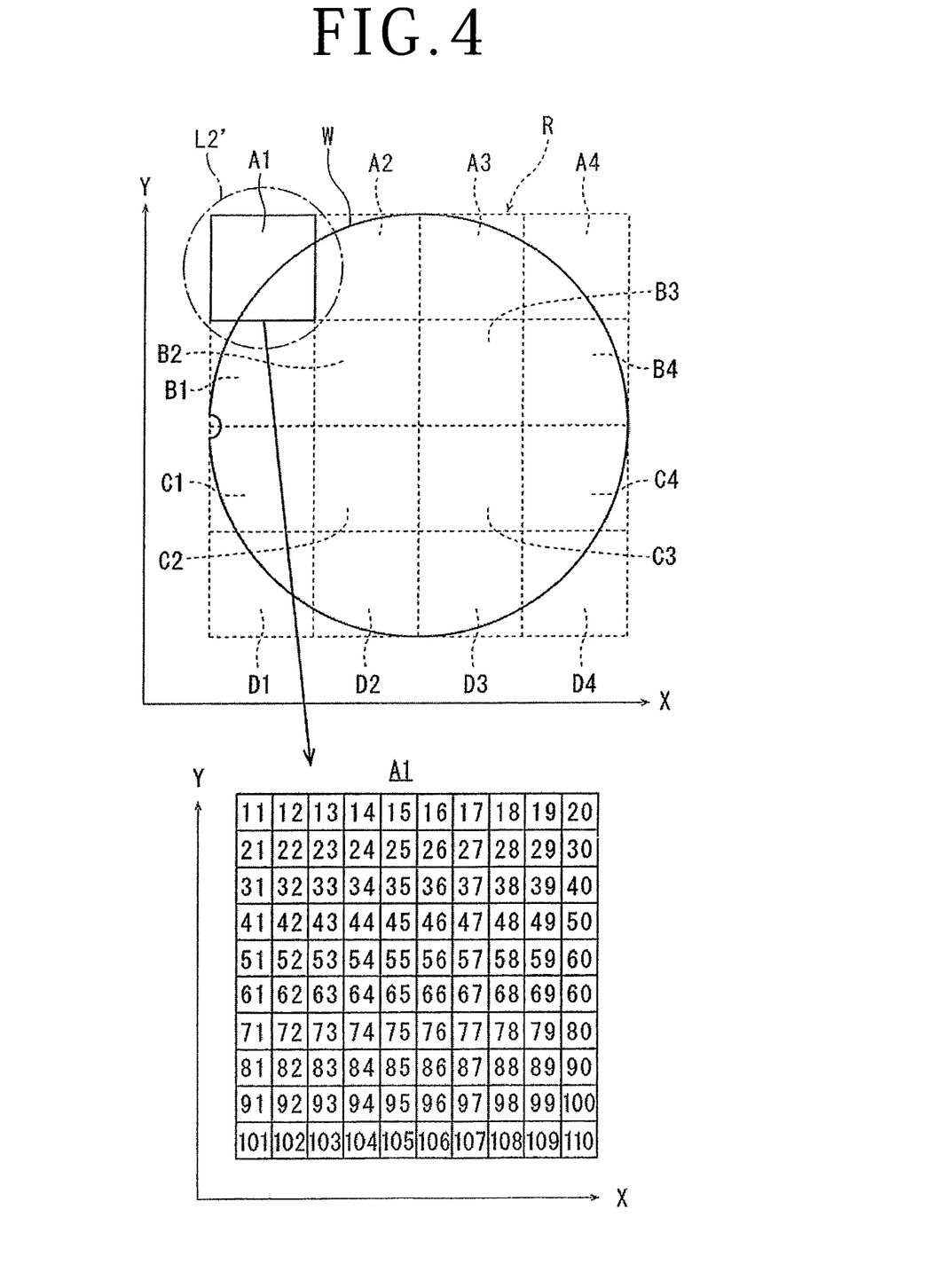
FIG. 4 is a conceptual diagram illustrating a two-dimensional area over a wafer.

The two-dimensional area, denoted by R in FIG. 4, covers the entire surface of the wafer W. As indicated by the dotted lines in FIG. 4, the two-dimensional area R is demarcated into divisions A1 through A4, B1 through B4, C1 through C4, and D1 through D4. Each of the divisions is defined by X- and Y-coordinates along the X-axis directions and the Y-axis directions. It is now assumed that the magnified diffracted light L2 is applied to the division A1 of the two-dimensional area R over the wafer W.

As illustrated in FIG. 4, the magnified diffracted light L2 is applied to an irradiation area L2' indicated as a circle by the dot-and-dash line. The irradiation area L2' includes the division A1 in its entirety. As indicated by a lower inset in FIG. 4, the division A1 is subdivided into subdivisions indicated by 11 through 110 whose positions are specified by X- and Y-coordinates along the X-axis directions and the Y-axis directions. The other divisions A2 through A4, B1 through B4, C1 through C4, and D1 through D4 are also subdivided into subdivisions. Any given position on the wafer W is identified by one of the subdivisions.

As illustrated in FIG. 2, the magnified diffracted light L2 applied vertically downwardly to the wafer W is reflected by the upper surface Wa and the lower surface Wb of the wafer W in the irradiation area L2', travels back as return light L3, and is applied again to the telecentric lens 65. The return light L3 that is applied to the telecentric lens 65 is converged thereby and guided to the beam splitter 64. Part of the return light L3 passes through the reflection surface 642, travels upwardly while being dispersed, and is guided to the collimation lens 66 disposed above the beam splitter 64. The return light L3 that is guided to the collimator lens 66 is converted thereby into parallel light as return light L4, which is detected by the photodetection area 672 of the two-dimensional image sensor 67.

Figure 5:
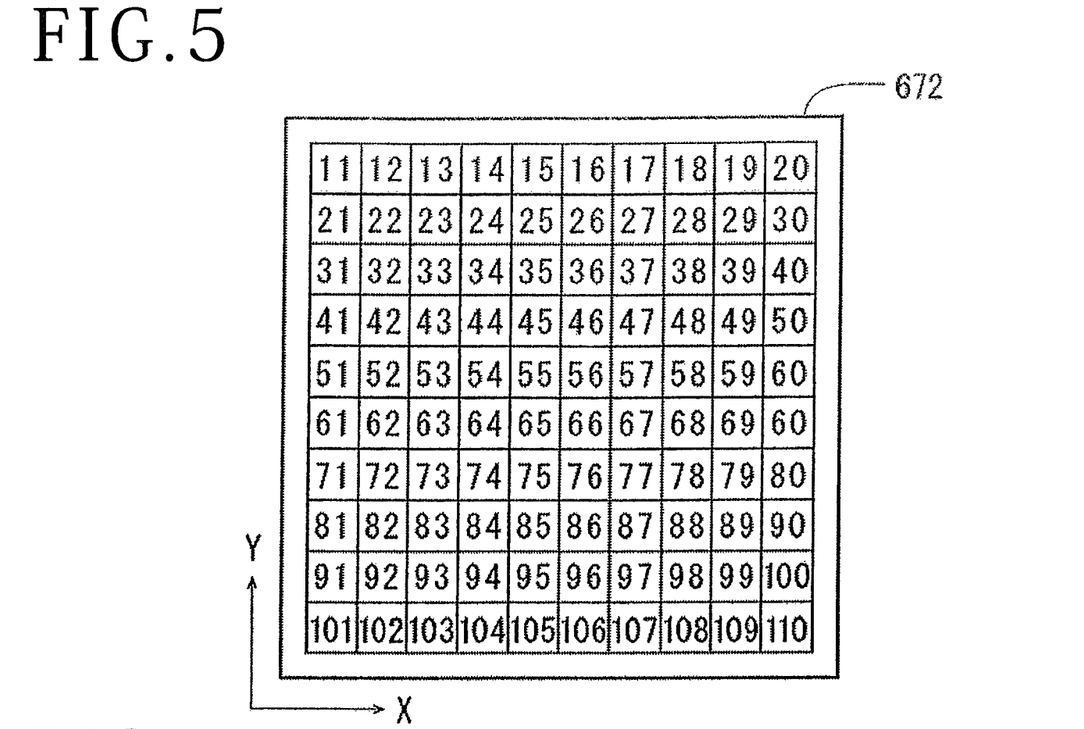
FIG. 5 is a diagram illustrating a photodetection area of a two-dimensional image sensor established for the two-dimensional area over the wafer illustrated in FIG. 4.

As illustrated in FIG. 5, the photodetection area 672 of the two-dimensional image sensor 67 is made up of a plurality of pixels 11 through 110, which correspond respectively to the subdivisions 11 through 111 of the division A1, assigned to an area defined by coordinate positions along the X-axis directions and the Y-axis directions in association with the two-dimensional area R over the wafer W. Therefore, the return light L4 reflected by the subdivision 110 of the division A1 on the wafer W, for example, is detected by the pixel 110 of the photodetection area 672. Consequently, the return light L4 reflected by the subdivisions 11 through 110 of the division A1 on the wafer W is detected by the pixels 11 through 110 of the photodetection area 672 that are defined so as to correspond respectively to the subdivisions 11 through 110. The return light L4 detected by the pixels 11 through 110 includes light components reflected respectively by the upper surface Wa and the lower surface Wb of the wafer W and having travelled along different optical path lengths. Each of the pixels 11 through 110 outputs the intensity of the return light L4 corresponding to the wavelengths of the diffracted light components successively detected at time differences, as a spectral interference waveform H illustrated in FIG. 6, to the control unit 10. The spectral interference waveform H output to the control unit 10 is stored in the storage unit 120 in association with each of the pixels 11 through 110 that correspond respectively to the subdivisions 11 through 110 of the division A1 of the two-dimensional area R.

Figure 6:
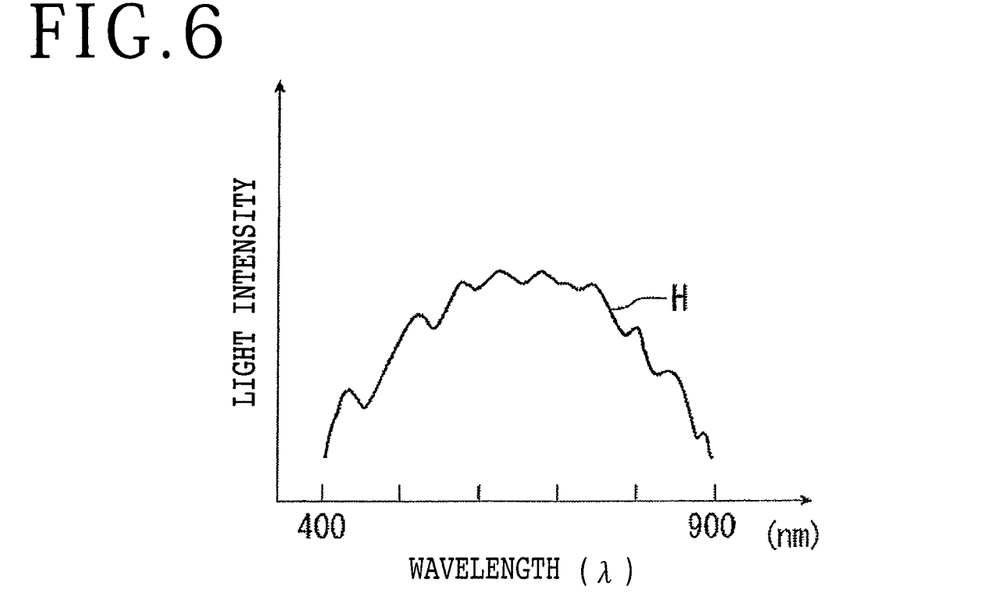
FIG. 6 is a diagram illustrating a spectral interference waveform produced by the thickness measuring unit.

A process in which the thickness deciding section 130 decides the thickness of the wafer W on the basis of the spectral interference waveform stored in the storage unit 120 will be described below. It is assumed that the spectral interference waveform H illustrated in FIG. 6 is output from the pixel 110 of the photodetection area 672 illustrated in FIG. 5 and the thickness deciding section 130 decides the thickness of the wafer W in the subdivision 110 of the division A1. The thickness deciding section 130 compares the spectral interference waveform H sent from the pixel 110 and stored in the storage unit 120 with the sample spectral interference waveforms stored in the waveform table 140, and determines whether the spectral interference waveform H agrees with each of the sample spectral interference waveforms or not. More specifically, the thickness deciding section 130 compares the spectral interference waveform H with the sample spectral interference waveforms and determines one of the sample spectral interference waveforms that agrees most with the spectral interference waveform H as to shape and phase. According to the present embodiment, it is determined that the spectral interference waveform H output from the pixel 110 agrees most with a sample spectral interference waveform S in the waveform table 140 illustrated in FIG. 3. Since the sample spectral interference waveform S is stored as corresponding to a thickness of 355 μm, the thickness deciding section 130 decides the thickness of 355 μm as a thickness detected on the basis of the difference between the optical paths for the light reflected by the upper surface Wa of the wafer W and the light reflected by the lower surface Wb of the wafer W in the subdivision 110.

Information about the thickness decided on the basis of the spectral interference waveform H obtained by the pixel 110 is stored together with information about X- and Y-coordinates for specifying the subdivision 110 of the division A1 in the storage unit 120. The same process is simultaneously performed on spectral interference waveforms obtained by the pixels 11 through 109, and thickness information and information about X- and Y-coordinates for specifying the subdivisions corresponding to the pixels 11 through 109 are stored in the storage unit 120.

In as much as the thickness measuring apparatus 6 according to the present embodiment includes the diffracting means 62 that generates light components at time differences depending on wavelengths thereof from the white light L0 and emits the light components, the thickness measuring apparatus 6 can simultaneously generate spectral interference wavelengths depending on the thicknesses of the wafer W in the subdivisions of one division of the wafer W. Therefore, the above process of determining the thicknesses of the wafer W corresponding to the respective subdivisions is carried out simultaneously for the subdivisions 11 through 110. Accordingly, the thicknesses of the wafer W over a wide area can efficiently be measured.

According to the above process, the thicknesses in the subdivisions 11 through 110 of the division A1 are decided quickly and efficiently. When the thicknesses in the entire division A1 have been stored in the storage unit 120, the moving mechanism 30 is actuated to move the chuck table 24 in one of the X-axis directions to position the division A2 adjacent to the division A1 in the irradiation area L2' for the magnified diffracted light L2 directly below the thickness measuring apparatus 6. Then, the same process of deciding thicknesses as the process carried out on the division A1 is performed to decide thicknesses in the subdivisions 11 through 110 of the division A2, after which the decided thicknesses are stored in the storage unit 120. Thereafter, the chuck table 24 is moved in the X-axis directions and the Y-axis directions and the same process is also carried out successively on the remaining divisions A3 through A4, B1 through B4, C1 through C4, and D1 through D4. In this manner, the thicknesses of the wafer W covered by the two-dimensional area R are decided efficiently and finely and stored in the storage unit 120 of the control unit 10.

After the thicknesses of the wafer W covered by the two-dimensional area R have been decided and measured, modified layers that act as division initiating points are formed in the wafer W along the projected dicing lines. Specifically, the alignment unit 50 of the laser processing apparatus 1 illustrated in FIG. 1 is energized to bring a processing position for the wafer W and an irradiation position to be irradiated by the laser beam from the laser beam applying unit 40 into alignment with each other. When the processing position and the irradiation position have been aligned, the wafer W is positioned directly below the beam condenser 42, and the laser beam applying unit 40 is activated. The laser beam whose wavelength is transmittable through the wafer W is emitted from the laser oscillator, not depicted, of the laser beam applying unit 40. The laser beam is applied to the wafer W along the projected dicing lines while the focused spot of the laser beam is being positioned within the wafer W. At the same time, the X-axis feeding mechanism 31 is actuated to move the chuck table 24 at a predetermined processing-feed speed in one of the X-axis directions indicated by the arrow X. According to the present embodiment, at this time, the thicknesses of the wafer W in the respective subdivisions of the two-dimensional area R defined by coordinate positions have been decided and stored in the storage unit 120. The focused spot of the laser beam can thus be positioned accurately in a predetermined position within the wafer W based on the upper surface Wa thereof. The control unit 10 controls the laser beam applying unit 40, the X-axis feeding mechanism 31, the Y-axis feeding mechanism 32, and the rotary drive means, not depicted, for rotating the chuck table 24 to form modified layers as division initiating points in desired positions within the wafer W along all the projected dicing lines.

The above step of forming modified layers in the wafer W is carried out by the laser beam applying unit 40 under the following laser processing conditions depicted below, for example.

Wavelength: 1064 nm
Average output power: 1 W
Repetitive frequency: 100 kHz
Pulse duration: 1 ns
Spot diameter: 1 μm
Processing-feed speed: 100 mm/s According to the present embodiment, as described above, the thicknesses of the wafer W in the respective subdivisions of the two-dimensional area R defined by the coordinate positions along the X-axis directions and the Y-axis directions are measured efficiently and stored in the storage unit 120. Since the laser processing apparatus 1 form modified layers in the wafer W using the information about the thicknesses stored in the storage unit 120, the laser processing apparatus 1 can perform the laser processing operation efficiently.

The present invention is not limited to the embodiment illustrated above. Instead, various changes and modifications may be made in the embodiment. In the above embodiment, the white light L0 emitted from the while light source 61 of the thickness measuring unit 60 is diffracted by the diffracting means 62, converted by the condenser lens 63, guided to the beam splitter 64, and then guided through the telecentric lens 65 and the collimation lens 66 before being detected by the two-dimensional image sensor 67 for measuring thicknesses. However, the diffracted light may not necessarily be guided through the condenser lens 63, the telecentric lens 65, and the collimation lens 66, but the diffracted light L1 emitted from the diffracting means 62 may be reflected by the beam splitter 64 and applied to the wafer W, and the return light L3 reflected by the wafer W may be transmitted through the beam splitter 64 and detected by the two-dimensional image sensor 67. Furthermore, in the above embodiment, the two-dimensional area R that covers the ware W is demarcated into the 16 divisions A1 through A4, B1 through B4, C1 through C4, and D1 through D4, and the magnified diffracted light L2 is generated by the condenser lens 63 and the telecentric lens 65 so as to cover those divisions. The present invention is not limited to such details. Depending on the size of the plate-shaped workpiece, i.e., the wafer W, to be measured and the number of points on the wafer W where thicknesses are to be measured, the range or area of each of the divisions demarcated from the two-dimensional area R may be changed, and the size of the irradiation area L2' to which the magnified diffracted light L2 is applied may be adjusted accordingly.

According to the above embodiment, furthermore, the thickness measuring unit 60 is incorporated in the laser processing apparatus 1 for forming modified layers in the wafer W. The present invention is not limited to such a detail. The present invention is also applicable to an apparatus for grinding or polishing a surface of a plate-shaped workpiece, a laser processing apparatus for performing an ablation process on a surface of a plate-shaped workpiece while positioning a focused spot of the laser beam on the surface of the plate-shaped workpiece, a dicing apparatus for cutting a plate-shaped workpiece using a cutting blade, and so on. The present invention contributes to an increase in processing efficiency if it is applied to a processing apparatus that needs thickness information of a plate-shaped workpiece to be processed thereby.

According to the above embodiment, moreover, the thickness measuring apparatus 6 is incorporated in the laser processing apparatus 1. However, the thickness measuring apparatus may not necessarily be integrally combined with the laser processing apparatus, but may be an independent thickness measuring apparatus dedicated to the measurement of thicknesses. In such a case, information about thicknesses that have been measured and stored by the independent thickness measuring apparatus may be sent to an appropriate processing apparatus for use in its processing operation.

The present invention is not limited to the details of the above described embodiment. The scope of the invention is defined by the appended claims and all changes and modifications as fall within the equivalence of the scope of the claims are therefore to be embraced by the invention.

What is claimed is:

1. A thickness measuring apparatus for measuring thicknesses of a plate-shaped workpiece, the thickness measuring apparatus comprising:
   a chuck table that holds the plate-shaped workpiece thereon; and
   a thickness measuring unit that measures thicknesses of the plate-shaped workpiece held on the chuck table in a non-contact manner, wherein
   the thickness measuring unit includes
      a white light source,
      diffracting means that diffracts white light emitted from the white light source into diffracted light at time differences corresponding to the wavelengths of light components of the white light,
      a beam splitter that applies diffracted light from the diffracting means to a telecentric lens for converting diffracted light dispersed from the beam splitter into parallel light and applying the parallel light directly to a two-dimensional area defined along X-axis directions and Y-axis directions over the plate-shaped workpiece held on the chuck table,
      a two-dimensional image sensor for detecting return light reflected from upper and lower surfaces of the plate-shaped workpiece in the two-dimensional area, through the beam splitter,
      a storage unit that stores, as a spectral interference waveform, intensities of the return light corresponding to the wavelengths of the light components successively received at the time differences by a plurality of pixels of the two-dimensional image sensor that are arrayed in the X-axis directions and the Y-axis directions in association with the two-dimensional area over the plate-shaped workpiece,
      a waveform table recording therein a plurality of kinds of sample spectral interference waveforms corresponding to plate-shaped workpiece thicknesses; and
      a thickness deciding section that decides thicknesses of the plate-shaped workpiece at coordinate positions defining the two-dimensional area over the plate-shaped workpiece based on spectral interference waveforms per each of pixels stored in the storage unit, and
   the thickness deciding section compares the spectral interference waveform stored in the storage unit with the sample spectral interference waveforms recorded in the waveform table and decides a plate-shaped workpiece thickness corresponding to one of the sample spectral interference waveform that has agreed with the spectral interference waveform as a thickness of the plate-shaped workpiece.

2. The thickness measuring apparatus according to claim 1, wherein
   the thickness measuring unit further includes
      a condenser lens disposed between the diffracting means and the beam splitter, and
      a collimation lens disposed between the beam splitter and the two-dimensional image sensor, for converting the return light reflected from the upper and lower surfaces of the plate-shaped workpiece into parallel light which is detected by the two-dimensional image sensor.

3. The thickness measuring apparatus according to claim 1, wherein
the white light source is selected from a group consisting of a superluminescent diode light source, an amplified spontaneous emission light source, a supercontinuum light source, a light-emitting diode light source, a halogen light source, a xenon light source, a mercury light source, and a metal halide light source.

4. The thickness measuring apparatus according to claim 1, wherein the workpiece is a silicon wafer.

5. The thickness measuring apparatus according to claim 4, wherein the wafer has a plurality of devices formed in areas demarcated by a plurality of projected dicing lines and is supported on the annular frame by the protective tape and wherein the frame is held by the chuck table.

6. The thickness measuring apparatus according to claim 1,
wherein the beam splitter simultaneously applies diffracted light from the diffracting means to the two-dimensional area over the workpiece held on the chuck table, and
wherein the two-dimensional image sensor simultaneously detects return light reflected from upper and lower surfaces of the workpiece in the two-dimensional area; and
wherein the thickness deciding section simultaneously decides thicknesses of the workpiece at coordinate positions defining the two-dimensional area over the workpiece.

7. The thickness measuring apparatus according to claim 1, wherein the diffracting means diffracts the white light into diffracted light at time differences corresponding to the wavelengths of light components of the white light and the light components comprise blue light, green light, yellow light and red light.

8. A thickness measuring apparatus for measuring thicknesses of a workpiece, the thickness measuring apparatus comprising:
a chuck table that holds the workpiece thereon; and
a thickness measuring unit that measures thicknesses of the workpiece held on the chuck table in a non-contact manner, wherein
the thickness measuring unit includes
a white light source,
diffracting means that diffracts white light emitted from the white light source into diffracted light at time differences corresponding to the wavelengths of light components of the white light,
a beam splitter that applies diffracted light from the diffracting means a telecentric lens for converting diffracted light dispersed from the beam splitter into parallel light and applying the parallel light to a two-dimensional area defined along X-axis directions and Y-axis directions over the workpiece held on the chuck table, the two-dimensional area comprising a plurality of subdivisions, the location of each subdivision being associated with distinct X, Y coordinates,
a two-dimensional image sensor for detecting return light reflected from upper and lower surfaces of the plurality of subdivisions of the workpiece in the two-dimensional area, through the beam splitter, the image sensor comprising a plurality of pixels arranged in a two-dimensional arrangement in the X-axis directions and the Y-axis directions in association with the two-dimensional area over the workpiece, wherein each pixel is associated with a corresponding subdivision of the two-dimensional area of the workpiece,
a first memory that stores, as a spectral interference waveform, intensities of the return light corresponding to the wavelengths of the light components successively received at the time differences by each of the plurality of pixels of the two-dimensional image sensor,
a waveform table stored in a second memory having recorded therein a plurality of kinds of sample spectral interference waveforms corresponding to workpiece thicknesses; and
a computer that decides thicknesses of the workpiece at each subdivision defining the two-dimensional area over the workpiece based on spectral interference waveforms per each of pixels stored in the storage unit, and
the computer compares the spectral interference waveform stored in the memory with the sample spectral interference waveforms recorded in the waveform table and decides a workpiece thickness for a given subdivision corresponding to one of the sample spectral interference waveform that has agreed with the spectral interference waveform associated with the corresponding pixel as a thickness of the subdivision of the workpiece.

9. The thickness measuring apparatus according to claim 8, wherein the thickness measuring unit further includes:
a condenser lens disposed between the diffracting means and the beam splitter, and
a collimation lens disposed between the beam splitter and the two-dimensional image sensor, for converting the return light reflected from the upper and lower surfaces of the workpiece into parallel light which is detected by the two-dimensional image sensor.

10. The thickness measuring apparatus according to claim 8,
wherein the white light source is selected from a group consisting of a superluminescent diode light source, an amplified spontaneous emission light source, a supercontinuum light source, a light-emitting diode light source, a halogen light source, a xenon light source, a mercury light source, and a metal halide light source.

11. The thickness measuring apparatus according to claim 8, wherein the first memory and the second memory are the same memory.

12. The thickness measuring apparatus according to claim 8, wherein the first memory and the second memory are different memories.

13. The thickness measuring apparatus according to claim 8, wherein the workpiece is a silicon wafer.

14. The thickness measuring apparatus according to claim 13, wherein the wafer has a plurality of devices formed in areas demarcated by a plurality of projected dicing lines and is supported on the annular frame by the protective tape and wherein the frame is held by the chuck table.

15. The thickness measuring apparatus according to claim 8,
wherein the beam splitter simultaneously applies diffracted light from the diffracting means to the plurality of subdivisions of the two-dimensional area over the workpiece held on the chuck table, and
wherein the plurality of pixels of the two-dimensional image sensor simultaneously detect return light reflected from upper and lower surfaces of the workpiece in the two-dimensional area; and wherein the thickness deciding section simultaneously decides thicknesses of the plurality of the subdivisions of the workpiece.

16. The thickness measuring apparatus according to claim 8, wherein the diffracting means diffracts the white light into diffracted light at time differences corresponding to the wavelengths of light components of the white light and the light components comprise blue light, green light, yellow light and red light.

* * * * *